United States Patent

[11] 3,583,462

| [72] | Inventor | Vincent A. Langelo<br>69 Old Orchard Road, Sherborn, Mass. 01770 |
|---|---|---|
| [21] | Appl. No. | 824,186 |
| [22] | Filed | May 13, 1969 |
| [45] | Patented | June 8, 1971 |

[54] ANTI-SKID TIRE APPARATUS
21 Claims, 15 Drawing Figs.

[52] U.S. Cl. ........................................ 152/211, 152/169
[51] Int. Cl. ........................................ B60c 11/00
[50] Field of Search ........................................ 152/211, 210, 169, 222, 179, 180

[56] References Cited
UNITED STATES PATENTS
2,696,864  12/1954  Crooker .................. 152/211

Primary Examiner—James B. Marbert
Attorney—John E. Toupal

ABSTRACT: A tire construction including traction members pivotally mounted within cavities formed by recessed portions in the tread. The traction members have friction surfaces that conform substantially to the tread surface with the members in a neutral position and gripping edges that project out of the tread recesses when the members are pivoted in either of opposite directions from the neutral position. The traction members pivot in one direction in response to surface applied friction of one sense and pivot in the opposite direction in response to surface applied frictional force of the opposite sense.

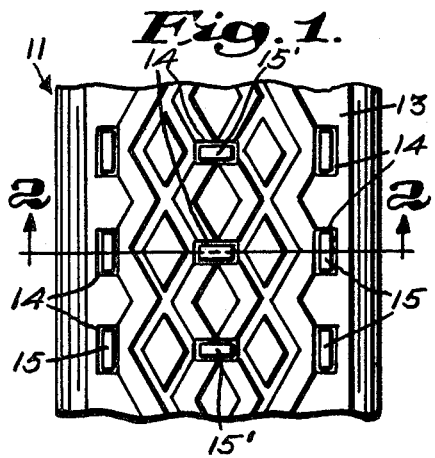
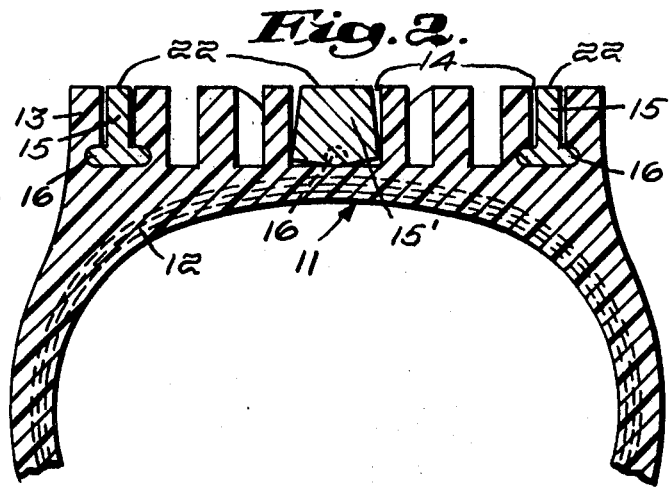
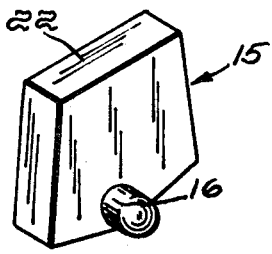
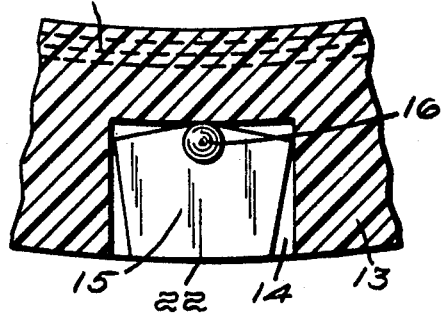
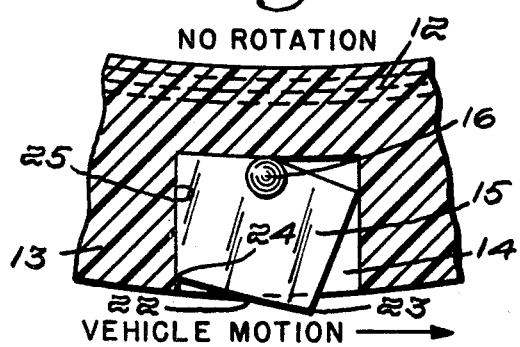
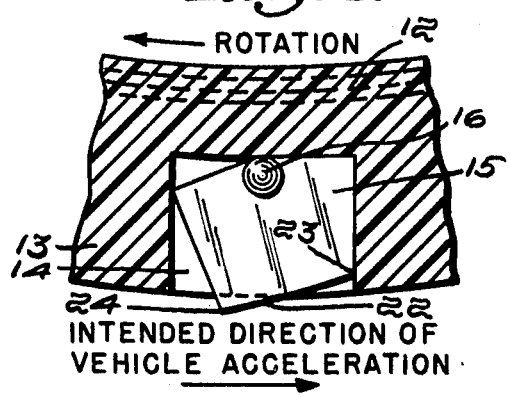

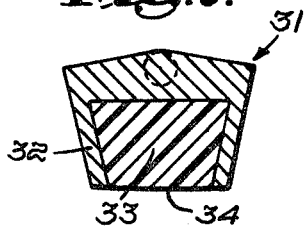
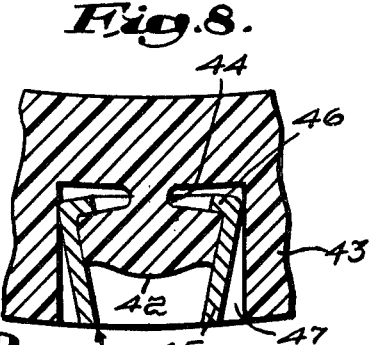
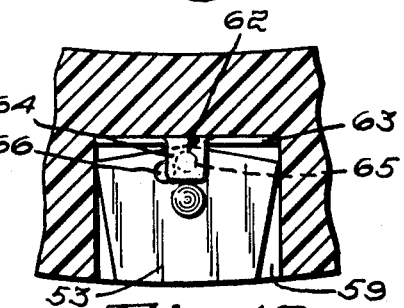
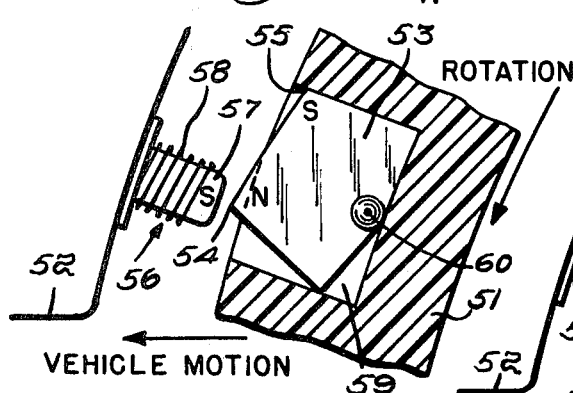
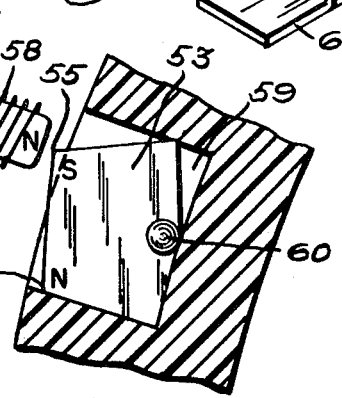
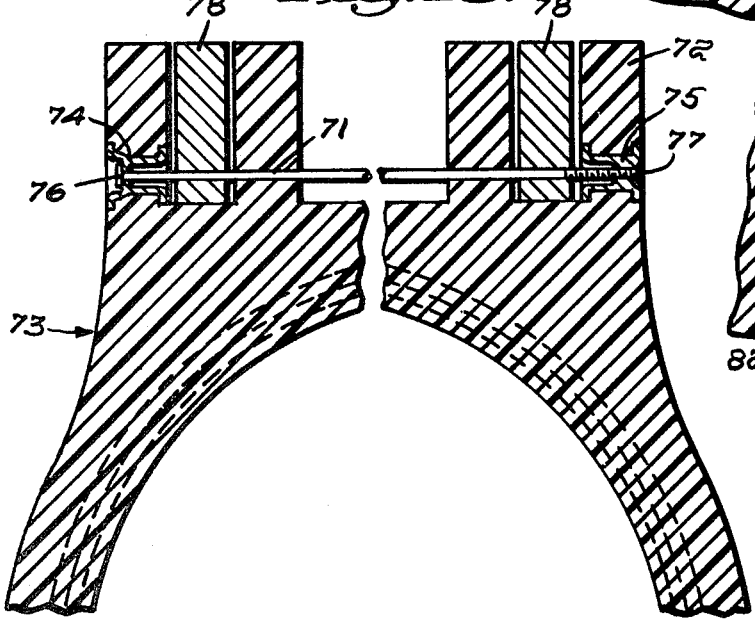
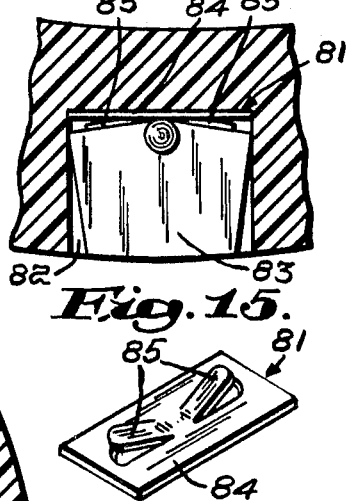
Inventor:
Vincent A. Langelo,
by John E. Toupal
Attorney

3,583,462

ANTI-SKID TIRE APPARATUS

BACKGROUND OF THE INVENTION

This invention relates generally to inflatable tires typically used on passenger vehicles and trucks and, more particularly, relates to such tires suitable for use during either fair or inclement weather.

Various types of so called "snow tires" are sold for use on slippery surfaces caused by snow, rain, ice, etc. Generally, such tires utilize relatively large tread recesses separated by lugs that provide better traction. However, use of such tires in fair weather is objectionable because of the noise they produce and because of the excessive abrasion that occurs on the lugs when operated over dry surfaces. For this reason most drivers resort to burdensome and expensive seasonable switching between snow and regular tires.

Also known are studded tires that utilize, for example, tungsten carbide studs embedded in the tire tread. When used on dry surfaces, the studs rather than the tread surface absorb most of the wear. Consequently, stud life is seriously diminished and the tire treads wear unevenly. In addition, the studded tire is objectionable because of the noise and road damage it produces when operating on the dry surfaces encountered a majority of the time in most geographical regions.

The object of this invention, therefore, is to provide an improved tire that provides good traction on slippery surfaces and alleviates problems associated with presently available tires on this type.

SUMMARY OF THE INVENTION

The invention is characterized by a provision of a vehicle tire with a tread having recessed cavities that accommodate pivotally mounted traction members. Dependent upon the sense of frictional force applied to frictional surfaces thereon, the traction members pivot in opposite directions from a neutral position into first and second active positions. In neutral positions, the friction surfaces conform substantially to the tread surface and the traction members are completely retracted within the tread cavities. Conversely, in the first and second active positions, peripheral edge portions of the traction members project out of the cavities to grip the road surface supporting the tire. Thus, during dry conditions the tire functions as a conventional tire but is automatically converted into a road gripping tire in response to frictional forces produced by slippage between the tire and a supporting road surface.

One feature of this invention is the provision of a tire of the above type wherein the traction members are distributed about the circumference of the tread and are adapted for pivotal movement about pivotal axes perpendicular to the plane of the tire. Pivotal movement of the traction members in one direction exposes gripping edges during acceleration of the vehicle on slippery surfaces and pivotal movement in the opposite direction exposes gripping edges for decelerating the vehicle on such surfaces.

Another feature of the invention is the provision of a vehicle tire of the above types including traction members adapted for movement about pivotal axes parallel to the plane of the tire. These traction members pivot in one direction to expose gripping edges in response to sideways slippage of one sense and pivot in the opposite direction to expose gripping edges in response to sideways slippage of the opposite sense.

Another feature of the invention is the provision of a tire of the above types wherein the friction surfaces of the traction members are relatively large in comparison to, for example, the contact surfaces of conventional tire studs. The use of large surfaces facilitates desired pivotal movement of the traction members by providing a relatively large area for application of frictional force.

Another feature of the invention is the provision of a tire of the above types wherein the traction members comprise shells of a hard material such as steel and cores of a material with a high coefficient of friction such as porcelain. Traction members of this type possess the structural strength of the shell material for traction and the desirable frictional properties of the core material for quick reaction.

Another feature of the invention is the provision of a tire of the above types including spring members that bias the traction members into their neutral positions. The spring members insure that the traction members return to their neutral positions when operating on dry road surfaces.

Another feature of the invention is the provision of a tire of the above types wherein the traction members have cores formed of the thread material and including flexible stem portions bonded thereto. The stems provide universal type pivotal connections that permit the traction members to expose gripping edges in response to the generation of frictional forces in any direction between the tread and supporting surface.

Another feature of the invention is the provision of a tire of the above types wherein the traction members are magnetized to provide friction surfaces with oppositely polarized peripheral portions that form the gripping edges. A suitably mounted electromagnet positioned, for example, beneath the vehicle's fender applies a magnetic field that produces pivotal movement of the traction members into desired active positions. Energization of the electromagnet in one sense produces pivotal traction member movement in one direction and energization of the opposite sense produces pivotal traction member movement in the opposite direction.

Another feature of the invention is the provision of a tire of the above type including detent mechanisms that retain the traction members in the active positions for decelerating the vehicle after having been set therein by the electromagnet. The detent mechanisms prevent return of the traction members to neutral positions in response to rolling contact between tire tread and road surface.

DESCRIPTION OF THE DRAWINGS

These and other objects and features of the present invention will become more apparent upon a perusal of the following specification taken in conjunction with the accompanying drawings wherein:

FIG. 1 is a fragmentary plan view of a tire tread according to a preferred embodiment of the invention;

FIG. 2 is a sectional view taken along line 2-2 of FIG. 1 viewed in the direction indicated by the arrows;

FIG. 3 is an enlarged perspective view of one of the traction members shown in FIG. 1;

FIG. 4 is an enlarged section view illustrating a traction member in its neutral position;

FIG. 5 is an enlarged sectional view illustrating a traction member in a first operating position;

FIG. 6 is an enlarged sectional view illustrating a traction member in a second operating position;

FIG. 7 is an enlarged sectional view of a modified traction member embodiment of the invention;

FIG. 8 is a fragmentary sectional view of a tire equipped with another modified traction member;

FIG. 9 is a schematic view of a magnetically actuated traction member embodiment of the invention;

FIG. 10 is another schematic view of the embodiment shown in FIG. 9 with the traction member in a different operating position;

FIG. 11 is a schematic illustration of a traction member and detent mechanism therefor;

FIG. 12 is a perspective view of the detent mechanism shown in FIG. 11;

FIG. 13 is a fragmentary cross-sectional view of another traction member embodiment;

FIG. 14 is a schematic view of a traction member and spring biasing mechanism therefor; and FIG. 15 is a perspective view of the spring member shown in FIG. 14.

DESCRIPTION OF THE PREFERRED EMBODIMENTS

Referring now to FIGS. 1—3 there is shown a vehicle tire 11 including a conventional casing 12 and a tread portion 13. Recessed portions in the tread 13 form a plurality of cavity regions 14 that individually accommodate the traction members 15 and 15'. Pivotally supporting the traction members 15 are integral shafts 16 that are embedded in the tread 13. The traction members 15 are forced into the cavity regions 14 by, for example, a hydraulic ram gun.

As shown in FIG. 1, the centrally disposed traction members 15' are mounted for pivotal movement about axes parallel to the plane of tire 11 while members 15 pivot about axes perpendicular thereto. Both sets of traction members 15 and 15' are distributed about the entire circumference of the tire tread 13. Each of the traction members 15 has a rectangularly shaped friction surface 22 that substantially conforms to the surface of tread 13 with the member 15 in a neutral position as illustrated in FIG. 4. In this position, the traction members 15 are completely retracted within the cavity regions 14.

Referring now to the view in FIG. 5 there is shown a traction member 15 pivoted into a first active position such that a peripheral portion of the friction surface 22 projects out of the cavity 14 exposing a gripping edge 23. Further rotational movement of member 15 in that direction is prevented by contact with inner walls 25 of the cavity 14.

FIG. 6 shows a traction member 15 rotated the opposite direction into a second active position. In this position the opposite peripheral portion of the friction surface 22 projects from the cavity 14 exposing the surface gripping edge 24. Again, further movement in this direction is prevented by contact of the member 15 with inner wall portions of the cavity 14.

During operation of the tire 11 in dry weather, the rolling friction produced between a road surface and the tread 13 is negligible and the traction members 15 assume the neutral positions illustrated in FIG. 4. Preferably, the tight fit between the shafts 16 and accommodating tread 13 prevent rotation of the traction members 15 during free rotation of the tire 11. Thus, in the absence of substantial frictional forces applied to the friction surfaces 22, the traction members 15 remain in the neutral position illustrated in FIG. 4.

Assume, however, that the vehicle is attempting to accelerate in the direction indicated in FIG. 6 and that slippage begins to occur between the rotating tire and a slippery road surface. The resultant relative movement between the road surface and the friction surface 22 generates thereon a frictional drag force applied in the direction of attempted acceleration. This drag force creates about pivot point 16 an unbalanced moment equal in magnitude to drag force times the distance between the shaft 16 and the applied force. Responsive to the unbalanced moment the traction member 15 is rotated in a counterclockwise direction. As the member 15 rotates, the gripping edge 24 presses harder on the road surface thereby causing the applied drag force to increase proportionally. This relative motion of the traction member 15 continues until the active position shown in FIG. 6 is achieved. In that position the extended gripping edge 24 penetrates the road surface providing the traction required to prevent or reduce slippage. It will be obvious that the above operation occurs in response to slippage between the rotating tire and a road surface regardless of whether the vehicle is moving or stationary. Upon termination of slippage and the related drag forces, the road surface applied a force on the edge 24 substantially perpendicular to the tread surface 13. This produces a clockwise movement about shaft 16 and returns the traction member 15 to the neutral position shown in FIG. 4.

Assume next that the vehicle is moving on a slippery road surface in the direction indicated in FIG. 5 and that the brakes are actuated. The braking action stops rotation of the tire which begins to slip on the road surface. Again a drag force is generated between the road surface and the frictional surface 22 of the traction member 15. However, in this case the force is applied to the friction surface 22 in a direction opposite to the direction of vehicle motion. Consequently, the resultant turning moment produces clockwise rotation of the traction members 15 until the active position shown in FIG. 5 is reached. In that position the gripping edge 23 penetrates the slippery road surface providing a greatly increased drag force decelerating the vehicle. As before, the members 15 reset themselves into the neutral position of FIG. 4 upon subsequent rotation of the tire 11 on a nonslippery road surface.

Friction member 15' function in basically the same manner to prevent uncontrolled sliding of a vehicle on slippery road surfaces. However, it will be obvious that members 15' respond to drag forces applied in directions perpendicular rather than parallel to the plane of the tire. Thus, traction members 15' are rotated into one active position in response to sideways vehicle motion of one sense and into a second active position in response to sideways motion of the opposite sense. In either the first or second active positions, exposed edges of the members 15' penetrate the road surface and produce forces that oppose the undesired sideways motion of the vehicle.

FIG. 7 illustrates a modified traction member 31 having the same external form as the traction member 15 shown in FIGS. 1—6. Member 31, however, comprises hollow shell 32 filled with a core material 33. Preferably the shell 32 is made of a structurally hard material such as hardened steel although a softer steel that will wear down with the tire tread also can be used. A material is selected for core 33 that has a high coefficient of friction, particularly on ice. For example, the core material can comprise some form of insulating material such as porcelain. The traction member 31 is mounted in the tire tread and functions in the same manner as traction member 15 described above. However, in this embodiment traction member 31 possesses both the structural strength of the shell material 32 and a friction surface 34 with the high friction coefficient exhibited by the core material 33.

FIG. 8 shows another traction member embodiment of the invention. In this case the traction member 41 includes a rubber core 42 molded with the tire as part of the tread 43. Joining the core 42 and tread 43 is an integral stem 44 that provides a universal type pivot connection between the tread 43 and traction member 41. A metal shell 45 is pressed over the core 42 and retained by the reentrant portions 46 formed, for example, by a suitable crimping tool.

The operation of traction member 41 is basically the same as that of traction members 15 described above. However, traction member 41 has the advantage of being able to pivot in any direction within the tread cavity 47 and therefore will respond to drag forces applied in any direction. Thus, each traction member 41 provides the functions of both members 15 and 15' described above.

Referring now to FIG. 9 there is illustrated another embodiment of the invention. Partially shown is the tire 51 mounted adjacent a fender 52 of a vehicle. In this embodiment the traction member 53 is magnetized to provide oppositely polarized peripheral edge portions 54 and 55. Mounted beneath the fender 52 adjacent the tire 51 is an electromagnet 56 having a core 57 and winding 58.

For operation of the FIG. 9 embodiment during dry weather conditions the winding 58 is deenergized and the traction members 53 assume the neutral positions illustrated in FIG. 4. However, when encountering slippery road surfaces the vehicle's driver actuates a suitable switch (not shown) to energize the winding 58 with a suitable current to produce on the outer end of core 57 a south pole as shown. Subsequently, as traction member 53 approaches the magnet 56, leading north pole 54 is attracted by the core 57 producing a clockwise moment about pivot point 60. A clockwise moment also is produced by the repelling force generated between the core 57 and the trailing south pole 55 of the traction member 53 which consequently is rotated into the active position shown. When the thusly activated traction member 53 reaches the road surface, extended edge 54 provides the desired traction to reduce slippage. Once positioned by the electromagnet 56, the traction member 53 will remain in the active position shown in FIG. 9 because of the frictional fit provided between its shaft 60 and the accommodating surfaces of cavity 59.

To decelerate a vehicle on slippery surfaces, current through the winding 58 is reversed producing at the outer end of core 57 a north pole that causes counterclockwise rotation of member 53 as shown in FIG. 10. Reversing the direction of current flow through winding 58 can be accomplished by a suitable switching arrangement (not shown) operated either manually by the driver or automatically by initial movement of the brake pedal slightly before further movement actually effects braking action. In the latter case, the premature switch actuation permits traction members 53 activated by electromagnet 56 to move into contact with the road surface before braking action stops wheel rotation. Thus, the projecting edge 55 will again be effective to penetrate the road surface and facilitate deceleration of the vehicle.

It will be noted in the FIG. 10 embodiment that initial contact between the road surface and an activated traction member 53 will produce a clockwise moment thereon. The moment tends to rotate member 53 back into its ineffective neutral position. To prevent this motion the detent retaining mechanism illustrated in FIGS. 11 and 12 is used. As shown, a detent 62 is positioned within cavity 59 beneath traction member 53. The detent 62 comprises a base 63 and arms 64 that include inwardly directed ears 65. Recesses 66 disclosed in the sides of traction members 53 receive the ears 65 upon rotation into the active position shown in FIG. 10.

Because of the retaining force provided by detents 62 the above noted contact force between road surface and traction members 53 will not rotate the members back into neutral positions. However, the retaining force of the detents is not sufficient to withstand the magnetic force applied by the electromagnet 56. Consequently, after again reversing the direction of current flow through winding 58 to produce a south pole in core 57, traction members passing the magnet 56 are returned to the active positions shown in FIG. 9. Furthermore, since the detent 62 is not effective in that position, subsequent normal rotation of the tire 51 on a dry surface produces the above noted contact force that returns the traction members to neutral positions. These positions are then maintained by completely deenergizing the electromagnet 56.

FIG. 13 illustrates another traction member support arrangement wherein a rod 71 extends transversely through a tread portion 72 of a tire 73. Embedded in opposite edges of the tread portion 72 are grommets 74 and 75 that accommodate ends of the rod 71. One end 76 of rod 71 comprises a screw head 76 while the opposite end 77 is threaded for engagement with the internally threaded grommet 75. Mounted for rotation on rod 71 are a group of traction members 78 each disposed within a cavity region of the tread 72. The operation of traction members 78 is identical to that described above with regard to traction members 15 shown in FIGS. 1— 6. This arrangement facilitates replacement of traction members 78 that become damaged by uneven surfaces such as protruding stones or pot holes.

As described above the press fits utilized for the various traction members will normally prevent free movement of the members in response to rotation of a tire. However, to insure that the traction members remain in their neutral positions in the absence of applied frictional drag forces, the spring biasing arrangement illustrated in FIGS. 14 and 15 can be incorporated. These mechanisms are particularly useful for the support embodiment of FIG. 13 wherein the traction members 78 are freely supported for rotation of rods 71.

As shown in FIGS. 14 and 15 a spring member 81 is disposed within a tread cavity 82 below a traction member 83. The spring member 81 includes a base 84 with partially cut out outwardly flared leaf portions 85. When positioned within the tread cavity 82 leaf spring portions 85 engage opposite internal surfaces of the traction member 83 so as to retard rotational movement thereof. Thus, spring member 81 tends to bias the traction member 83 into its neutral position. It will be obvious that the spring member 81 is selected with a spring tension that will not prevent rotation of the traction member 83 in response to applied frictional drag forces as described above.

Obviously, many modifications and variations of the present invention are possible in light of the above teachings. It is to be understood, therefore, that the invention can be practiced otherwise than as specifically described.

What I claim is:

1. A tire for mounting on the rotatable wheel of a vehicle and comprising:

a tread portion adapted for rolling contact with a vehicle supporting surface, said tread portion including recessed portions, a plurality of traction members pivotally mounted within the cavity regions formed by said recessed portions, and wherein each of said traction members is pivotable in opposite directions from a neutral position into first and second active positions.

2. A tire according to claim 1 wherein said traction members are completely retracted within said cavity regions while in said neutral positions and project out of said cavity regions while in said first and second active positions.

3. A tire according to claim 2 wherein given portions of each of said traction members project out of said cavity regions in said first positions and different portions of each of said traction members project out of said cavity regions in said second positions.

4. A tire according to claim 3 wherein said traction members comprise exposed friction surfaces of substantial area that conform substantially to the surface of said tread while in said neutral position.

5. A tire according to claim 4 wherein said given and different portions of said traction members comprise peripheral portions on opposite side of said friction surfaces.

6. A tire according to claim 5 wherein lines substantially normal to said friction surfaces and passing through the pivotal connections of said traction members are radially disposed with respect to said tire with said traction members in said neutral position.

7. A tire according to claim 5 wherein said traction members include members distributed about the circumference of said tread and adapted for movement about pivotal axes perpendicular to the plane of said tire.

8. A tire according to claim 7 wherein said friction surfaces are substantially rectangular in shape.

9. A tire according to claim 7 wherein said traction members further include members adapted for movement about pivotal axes parallel to the plane of said tire.

10. A tire according to claim 8 wherein said traction members are pivotally mounted on rods embedded in said tread.

11. A tire according to claim 10 wherein said friction members include groups of members pivotally mounted on a single rod extending through said tread in a direction perpendicular to the plane of said tire.

12. A tire according to claim 5 wherein said traction members comprise shells composed of one material and cores composed of a different material.

13. A tire according to claim 12 wherein said cores include flexible stem portions integrally connected to said tread so as to provide the pivotal mounting of said traction members.

14. A tire according to claim 13 wherein said stems permit universal pivotal movement of said traction members.

15. A tire according to claim 14 wherein said friction surfaces have the forms of closed plane curves.

16. A tire according to claim 5 wherein said traction members are magnetized.

17. A tire according to claim 16 wherein peripheral portions on opposite sides of said friction surfaces are oppositely polarized so as to produce pivotal movement of said traction members in one direction in response to an applied magnetic field of one polarity and in the opposite direction in response to applied magnetic field of the opposite polarity.

18. A tire according to claim 17 wherein said traction members include members distributed about the circumference of said tread and adapted for movement about pivotal axes perpendicular to the plane of said tire.

19. A tire according to claim 17 including retaining means adapted to retain said traction members in one of said active positions.

20. A tire according to claim 19 wherein said friction surfaces are substantially rectangular in shape.

21. A tire according to claim 5 including biasing means adapted to bias said traction members into said neutral position.